United States Patent [19]

Harbaugh et al.

[11] 4,393,018

[45] Jul. 12, 1983

[54] METHOD FOR MAKING A CONCRETE BLOCK

[75] Inventors: William L. Harbaugh, Westmoreland County; Raymond S. Smetana, Butler County, both of Pa.

[73] Assignee: Burrell Construction & Supply Co., New Kensington, Pa.

[21] Appl. No.: 299,941

[22] Filed: Sep. 8, 1981

[51] Int. Cl.³ .............................................. F26B 3/00
[52] U.S. Cl. ...................................... 264/82; 264/86; 264/333
[58] Field of Search ........................... 264/333, 82, 86

[56] References Cited

U.S. PATENT DOCUMENTS

| 3,366,720 | 1/1968 | Burger | 264/333 |
| 3,442,991 | 5/1969 | Lanz | 264/42 |
| 3,806,571 | 4/1974 | Ronnmark | 264/333 |
| 4,108,933 | 8/1978 | Gorannson | 264/333 |
| 4,244,904 | 1/1981 | Drain | 264/333 |

OTHER PUBLICATIONS

Beaudoin et al., "Partial Replacement of Cement by Fly Ash in Autoclaved Products-Theory and Practice," *J. Material Science,* 14 (1979), 1681-1693.

Publication—Development Testing and Analysis of Steel-Fiber-Reinforced Concrete Mine Support Members, by G. L. Anderson and T. W. Smelser, Bureau of Mines Report of Investigation RI 8142, U.S. Department of the Interior.

*Primary Examiner*—John A. Parrish
*Attorney, Agent, or Firm*—Buell, Blenko, Ziesenheim & Beck

[57] ABSTRACT

A method for making metal fiber reinforced concrete block which comprises formimg a mix of aggregates to which metal fibers and the cement are added. Water is added to the mix to form a mixture which is poured into a mold having two parallel spaced apart surfaces. A stripper is advanced through the mold and frictionally engages the inner surfaces of the two parallel walls and removes the concrete block.

18 Claims, 1 Drawing Figure

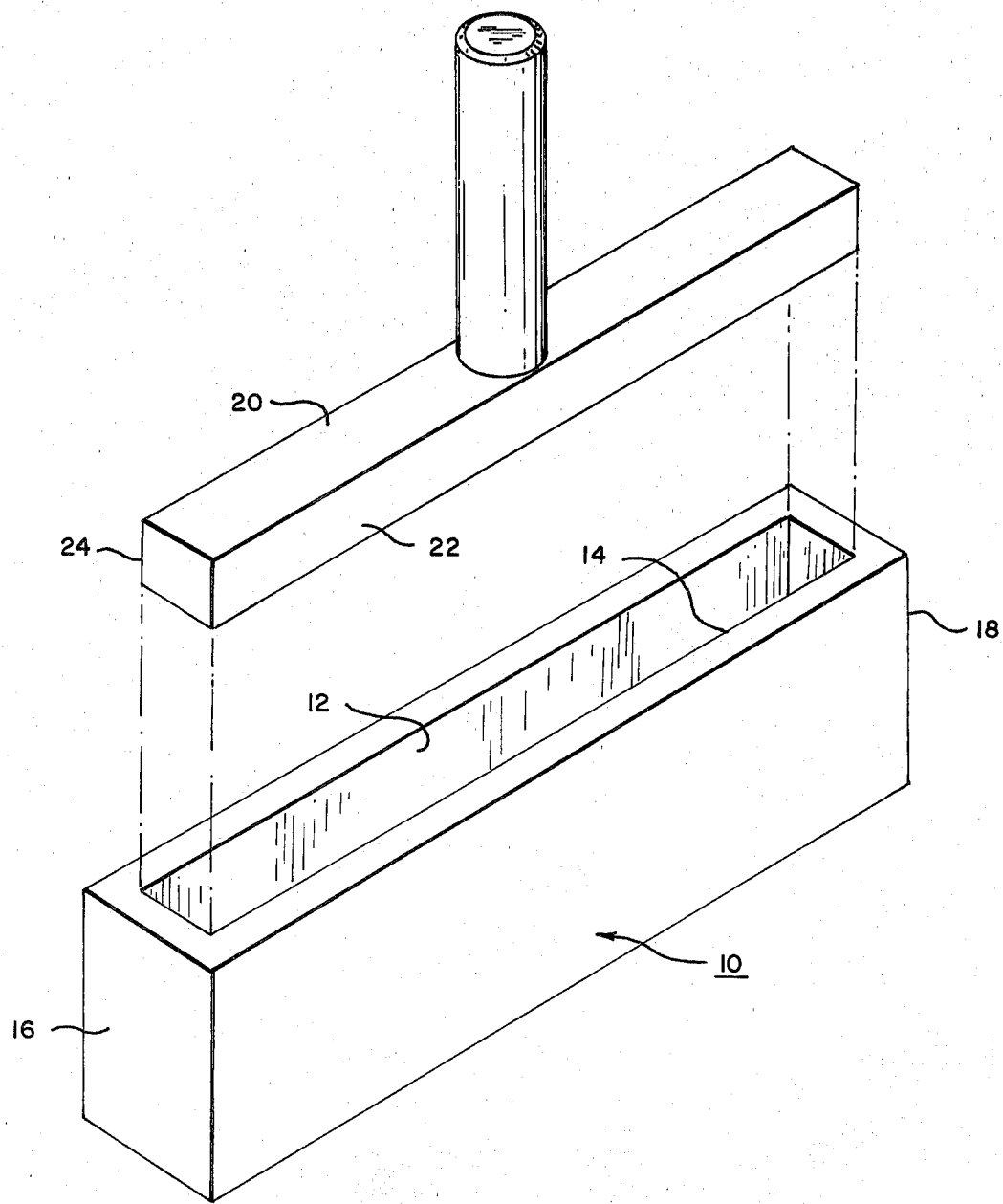

METHOD FOR MAKING A CONCRETE BLOCK

The invention relates to a method for making metal fiber reinforced concrete blocks used for cribbing for mine roof support systems.

PROBLEM

The mining industry searched for material to replace conventional wood cribbing to maintain positive roof support and at the same time reduce the cost of the support system. Wood has a compressive strength of 500 PSI. The requirements of the material to replace the wood is that it must: have greater compressive strength; use less space to obtain greater support capacity; be non-flammable; be non-biodegradable; avoid adding to methane generation; be easier to handle and install; have an indefinite storage life; and have lower installation time. To meet these requirements a concrete block was prepared by the Bureau of Mines. Cribbing made of such block is able to take slack in the mine roof thereby greatly reducing the roof-to-floor closure without failure.

Cribs constructed of concrete blocks are cross stacked without mortar in square or rectangular columns similar to wooden cribs. The first layer of cribbing is leveled by locally excavating the floor. The crib is erected to distribute the load evenly. The outer physical dimensions of every block must have their contacting surfaces uniform to prevent stress points from building within any block which would cause crumbling. Blocks can be made by hand which could maintain this uniformity however, this would make the cost prohibitive and limit supply.

The inventors developed a method of making the block which can be used to mass produce the block and which gives the necessary compressive strength and uniformity of the critical surfaces of the block.

DRAWING

The FIGURE shows a perspective view of a mold with a corresponding stripper member for removing a concrete block from the mold.

DETAILED DESCRIPTION

The FIGURE shows a mold 10 which has two parallel, aligned and spaced apart inner face walls 12 and 14 which are 23 inches long and 7⅝ inches high. The end walls 16 and 18 are 3⅝ inches wide inside. The mold 10, therefore, produces a block 23 inches×7⅝×3⅝. The blocks are stacked in such a manner that the planar dimensions of 23 inches×7⅝ lay flat, one on top of the other. It is therefore important that the surface defined by the 23 inches×7⅝ inches be flat and uniform to avoid any irregularities. It is also important that the thickness of the block, namely the 3⅝ inches, remain constant to achieve uniformity. To achieve the uniform thickness of the block the deviation from parallel throughout the spacing of the walls 12 and 14 should not be greater than plus or minus 0.032 inches and preferably should be not more than 0.010 inches.

In making the concrete block a mix is made using: river sand having a fineness modulus in a range of 2.75 to 3.00 and which is in a weight range of between 30% to 60% by weight of the entire mix preferably 44% by weight of the mix; river gravel which is ⅛ inch×⅛ inch and 25% to 50% by weight of the entire mix and preferably 36.7% by weight of the mix. These aggregates are designated as A.S.T.M. C-33. The mix also contains metal fibers which range in length between 20 mm. to 50 mm. (or 0.7874 inches to 1.9685 inches) with a diameter of 0.50 mm. to 0.80 mm. (or 0.02 inches to 0.03 inches). The fibers form between 1% to 4% by weight of the mix and preferably 1.96% by weight of the mix. These fibers are sold by Bekaert Steel Wire Corporation, Niles, Illinois under the mark DRAMIX. It is important to add these fibers discretely by separating them while adding them to the aggregates and mixing them before any cement is added. If the cement is added before or simultaneously with the metal fibers the proper dispersion of the fibers will not take place. Cement is then added and forms part of the mix. The cement comprises between 10% to 16% by weight of the mix and peferrably 14.8% by weight of the mix. The cement is identified as A.S.T.M. Type III C-150. Fly ash is added and forms part of the mix which is 1% to 5% by weight of the mix and preferably 2.4% by weight of the mix. A plasticizer which forms part of the mix is added at a rate of 1.75 ounces per 100 pounds of cement.

Water is added to the mix to form a mixture which is poured into the mold 10. The mold 10 is filled and compacted over a time period not less than two seconds to achieve proper compaction.

A stripper means 20 having longitudinal faces 22 and 24 frictionally engages the inner surfaces 14 and 12 respectively and removes the cement block. This frictional engagement is necessary to achieve a uniformity of the corresponding block faces which are formed by walls 12 and 14 and avoid any protruding fibers on the surface.

After the block is removed from the mold it should set between 1 to 4 hours and then steam heat is applied at a rate of increase of 60° F. per hour until a range of 120° F. to 190° F. is reached. After the desired temperature is reached the steam heat is maintained for 10 hours. Then dry heat at 180° F. is applied for 22 hours. Heat is then removed from the block at a rate of 50° F. per hour.

This results in a block which has an individual compressive strength of 5,200 PSI and when installed in a crib configuration develops 3,000 PSI compressive strength. Each block weighs approximately 50 pounds and has post-failure toughness and will not easily crumble.

We claim:
1. A method for making metal fiber reinforced concrete block having a pair of opposite parallel surfaces in which the deviation from parallel throughout the spacing of the surfaces is not greater than plus or minus 0.032 inches and when installed in a crib configuration the crib develops 3,000 PSI compressive strength comprising:
   a. providing a mold having two parallel, aligned, spaced apart inner face walls wherein the deviation from the parallel alignment of the inner face walls of the mold is not greater than plus or minus 0.032 inches;
   b. providing a mix as follows:
      (1) commencing with aggregates;
      (2) adding metal fibers to the aggregates and mixing them with the aggregates; and
      (3) then adding cement to the aggregates and metal fibers;
   c. adding water to the mix and forming a mixture;
   d. filling a mold with the mixture and compacting it in the mold to form the concrete block; and e. advancing a stripper means through the mold wherein the stripper means frictionally engages the inner surfaces of the two parallel walls and removes the concrete block from the mold.

2. A method as recited in claim 1 wherein the aggregates include:
   a. sand having a fineness modulus in a range of 2.75 to 3.00 and which is between 30% to 60% by weight of the mix; and
   b. gravel which is between 25% to 50% by weight of the mix.

3. A method as recited in claim 1 wherein the aggregates include:
   a. sand having a fineness modulus in a range of 2.75 to 3.00 and which is between 30% to 60% by weight of the mix; and
   b. gravel ½ inch by ⅛ inch which is between 25% to 50% by weight of the mix.

4. A method as recited in claim 1 wherein the aggregates include:
   a. sand having a fineness modulus in a range of 2.75 to 3.00 and which is 44% by weight of the mix; and
   b. gravel which is 36.7% by weight of the mix.

5. A method as recited in claim 1 wherein the metal fibers are in the range of 0.787 inches to 1.9685 inches in length and the fibers are between 1% to 4% by weight of the mix.

6. A method as recited in claim 1 wherein the metal fibers are in the range of 0.787 inches to 1.9685 inches in length and the fibers are 1.96% by weight of the mix.

7. A method as recited in claim 1 wherein the metal fibers are discretely added to the aggregates before the cement is added to the mix.

8. A method as recited in claim 1 wherein the cement is type III and between 10% to 16% by weight of the mix.

9. A method as recited in claim 1 wherein the cement is type III and is 14.8% by weight of the mix.

10. A method as recited in claim 1 including adding fly ash to the mix which is between 1% to 5% of the weight of the mix.

11. A method as recited in claim 1 including adding fly ash to the mix which is 2.4% by weight of the mix.

12. A method as recited in claim 1 including adding a plasticizer to the mix.

13. A method as recited in claim 1 including adding a plasticizer to the mix at a rate of 1.75 ounces per 100 pounds of cement.

14. A method as recited in claim 1 including filling the mold with the mixture and compacting it in the mold to form the concrete block, the filling and compacting is accomplished in a time period of not less than two seconds.

15. A method as recited in claim 1 including allowing the block which is removed from the mold to set for 1 to 4 hours.

16. A method as recited in claim 1 including applying steam heat to the block after it is removed from the mold at a rate of increase of 60° F. per hour until a range of 120° F. to 190° F. is reached and then continuing to apply the steam for 10 hours.

17. A method as recited in claim 1 including applying dry heat to the block at 180° F. for 22 hours.

18. A method as recited in claim 1 including removing heat from the block at a rate of 50° F. per hour.

* * * * *